July 11, 1961     R. H. MERKLE     2,991,804
AIR SUSPENSION AND CONTROL APPARATUS THEREFOR
Filed May 27, 1959     2 Sheets-Sheet 1
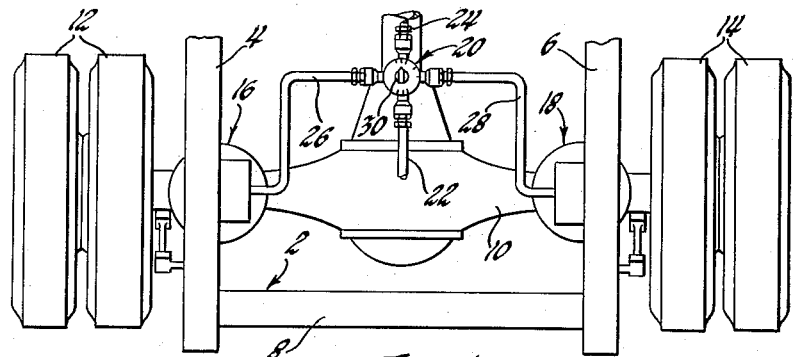
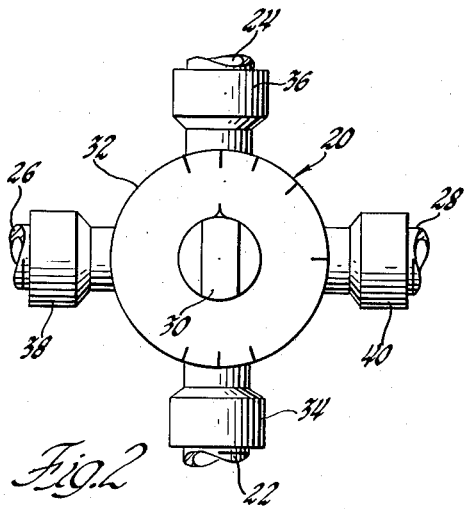
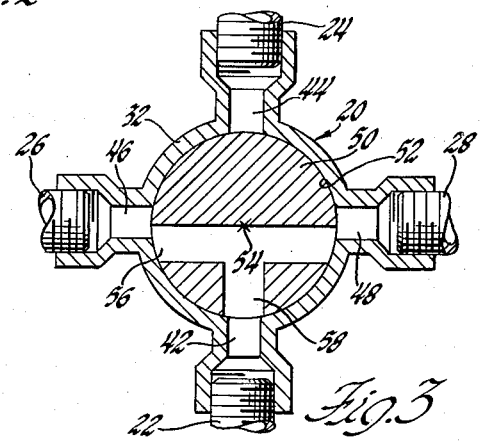
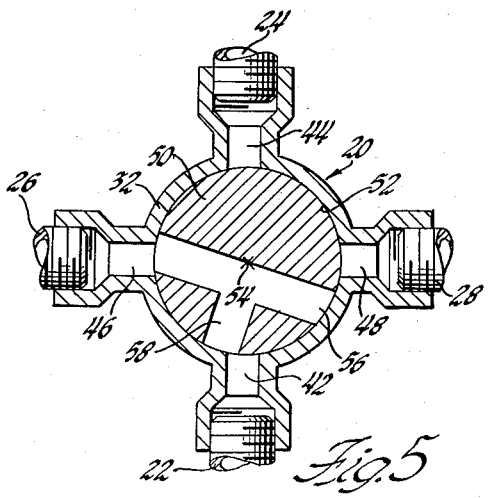
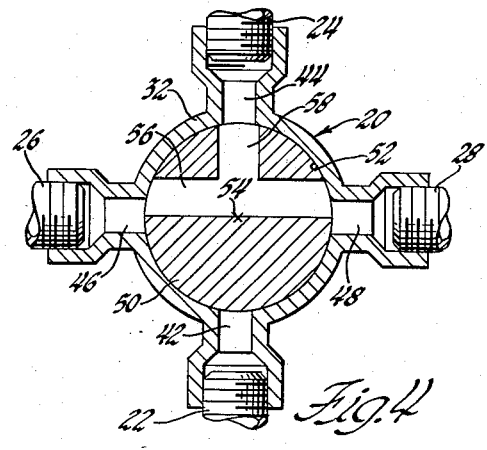
INVENTOR.
Ralph H. Merkle
BY W. F. Wagner
ATTORNEY July 11, 1961   R. H. MERKLE   2,991,804
AIR SUSPENSION AND CONTROL APPARATUS THEREFOR
Filed May 27, 1959   2 Sheets-Sheet 2
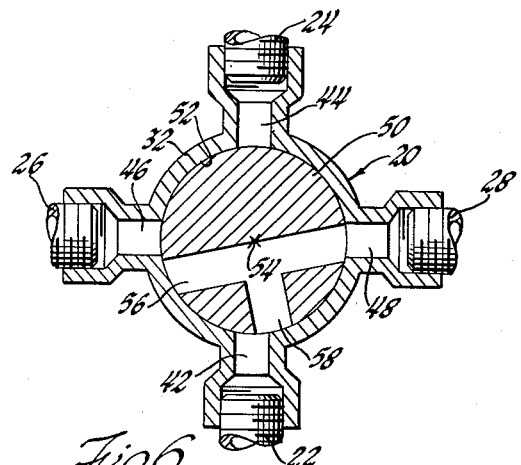
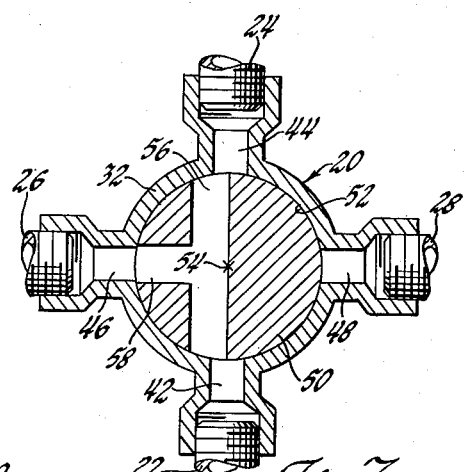
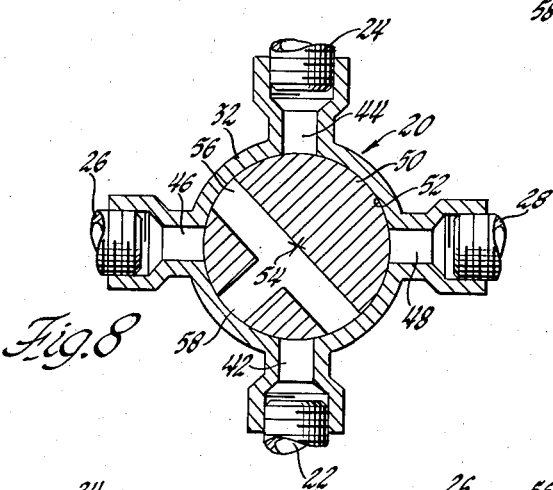
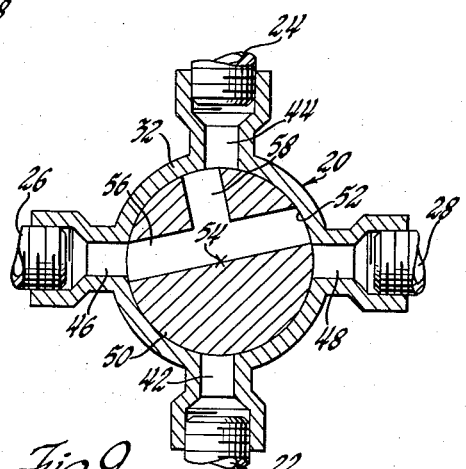
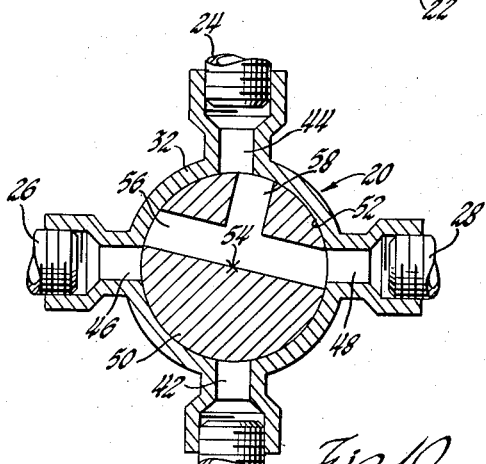
INVENTOR.
Ralph H. Merkle
BY
W. F. Wagner
ATTORNEY

United States Patent Office 2,991,804
Patented July 11, 1961

2,991,804
AIR SUSPENSION AND CONTROL APPARATUS THEREFOR

Ralph H. Merkle, Milford, Mich., assignor to General Motors Corporation, Detroit, Mich., a corporation of Delaware
Filed May 27, 1959, Ser. No. 816,280
3 Claims. (Cl. 137—625.23)

This invention relates to vehicle suspension and more particularly to pneumatic suspension incorporating manually operated control apparatus.

An object of the invention is to provide an improved and simplified pneumatic suspension system.

Another object is to provide an air suspension system incorporating simplified and improved manually controlled fluid distribution apparatus.

A further object is to provide in a pneumatic suspension system a single manually operated control movable to a plurality of positions providing a wide diversity of system behavior in terms of independent, coincidental, and alternative air flow to and from the various system components.

Still a further object is to provide an arrangement of the stated character wherein the control valve utilizes a single rotary operating element.

A still further object is to provide in an arrangement of the stated character a control valve comprising a cylindrical valve body having four ports formed therein at equally spaced circumferential intervals communicating with a cylindrical hollow interior, and a rotary operating element disposed in the body, which element is provided with cooperating passageways capable of orientation with respect to the ports so that any desired static condition of the system may be maintained or any desired combination of filling and exhausting of individual springs and source of fluid pressure may be accomplished.

Yet another object is to provide a control valve of the stated character wherein one of the passageways in the operating element extends completely therethrough on an axis perpendicular to but offset from the axis of rotation of the element, while another of the passageways extends partially through the element on an axis perpendicular to and intersecting the axis of rotation of the element.

These and other objects, advantages, and features of the invention will become more fully apparent as reference is had to the accompanying specification and drawings wherein:

FIG. 1 is a schematic view of a vehicle rear wheel suspension structure incorporating the present invention;

FIG. 2 is an enlarged fragmentary plan view, illustrating the indexing pattern of the manual control device according to the invention; and FIGS. 3 through 10 are sectional views of the device shown in FIG. 2 illustrating indexed positions of the operating element in addition to the position shown in FIG. 2.

Referring now to the drawings and particularly FIG. 1, reference numeral 2 designates generally the sprung mass or supported portion of a vehicle such as a truck tractor which includes frame side rails 4 and 6 and rear cross member 8. Extending transversely beneath frame 2 is a rear axle assembly 10, the lateral opposite ends of which have rotatably supported thereon dual wheel assemblies 12 and 14. Sprung mass 2 is resiliently suspended with reference to axle 10 and wheels 12 and 14 by means of conventional air spring assemblies 16 and 18. In accordance with the general features of the present invention, control of air flow into and out of spring assemblies 16 and 18 is effected by means of a manually operated valve assembly 20 which in the illustrated embodiment is shown in close proximity to springs 16 and 18. It will be understood, however, that the location of valve assembly 20 is for illustrative purposes only and that in practice such valve would preferably be located within convenient reach of the vehicle operator as for example on the vehicle instrument panel, not shown. Valve assembly 20 is adapted for connection in communicating relation with a source of high pressure air, not shown, by means of a conduit 22 and in communicating relation with atmosphere by a conduit 24. Two additional conduits 26 and 28 respectively connect valve assembly 20 with springs 16 and 18. A rotary control knob 30 located centrally on assembly 20 facilitates operation of the latter in the manner shortly to be described.

As seen best in FIG. 2, valve assembly 20 comprises an outer cylindrical casing 32 having integral radially extending portions 34, 36, 38, and 40 adapted for connection with conduits 22, 24, 26, and 28, respectively. Portions 34, 36, 38, and 40 are disposed in equally spaced relation circumferential of casing 32 and have ports 42, 44, 46, and 48 formed therein which communicate with the hollow interior of the casing. The interior of casing 32 is cylindrical in form and has disposed therein a tapered rotary operating element 50 of circular configuration which closely interfits the inner circular periphery 52 of casing 32. Element 50 rotates about an imaginary axis 54 coaxial with the circular periphery 52 of casing 32. According to one feature of the invention, operating element 50 is formed with a drilled passage 56 which extends completely through element 50 on an axis transverse to the axis of rotation 54 and a second drilled passage 58 which extends through element 50 on an axis perpendicular to passage 56 and colinear with rotation axis 54, a distance sufficient to provide communication with passage 56.

According to the principal feature of the invention, passage 56 is located in element 50 so that the axis of the former is offset or spaced from the axis of rotation 54 of element 50. By virtue of the simple but extremely significant spatial disposition of passage 56, it is possible to provide a wide variety of flow control positions by simple rotary manipulation of knob 30, each of which positions produces a specific difference in fluid flow pattern in the suspension system illustrated in FIG. 1. In order that the operation of the device may be more clearly understood, a description of the operation of the system with reference to each of the illustrated selector positions of FIGS. 3 through 10 follows.

With element 50 disposed in the position shown in FIG. 3, communication is provided between the source of fluid pressure, not shown, and each of springs 16 and 18. Accordingly, both springs are simultaneously progressively inflated until the desired vehicle standing height is achieved, at which time element 50 is manually adjusted to the angular position shown in FIG. 8 which results in simultaneous blocking of each of ports 42, 44, 46, and 48. Upon movement of element 50 to the position shown in FIG. 4, both springs 16 and 18 are placed in open communication with atmosphere, allowing simultaneous exhaust of air therefrom until this sprung mass of the vehicle descends to the desired height, at which time element 50 is again returned to the position shown in FIG. 8. With element 50 in the position shown in FIG. 5, communication is provided between the source of air pressure and spring 16 only. Therefore, the air pressure spring 18 remains at the existing level, while spring 16 is gradually inflated. This position of valve control 30 allows correction for lateral maldistribution of load. When such maldistribution has been corrected by increased inflation of spring 16, element 50 is again returned to the position of FIG. 8. With element 50 in the position shown in FIG. 6, the action is converse to that described with respect to FIG. 4 which results in progressive inflation of spring 18, while the pressure in spring 16 remains at the existing level.

When disposed in the position shown in FIG. 7, element 50 allows the high pressure source to be exhausted to atmosphere, as for example when it is desired to clean the high pressure tank or relieve the system pressure for service or repair. It will be understood that complete exhausting of the system will require the additional step of reversing the position shown 180° to relieve the pressure in spring 18 or by moving element 50 to the position shown in FIG. 4.

With element 50 in the positions shown respectively in FIGS. 9 and 10, either spring 16 or spring 18 may be exhausted separately. It will be understood that control knob 30 will be initially adjusted and oriented with respect to suitable indicator markings such as shown in FIG. 2 so that the various angular positions of the elements are correlated with indicator positions of knob 30.

From the foregoing it will be seen that the present invention provides a simple, inexpensive and versatile control which is especially suitable for use in conjunction with pneumatic suspension for cargo carrying vehicles. The device not only provides a wide latitude of control but has the very significant advantage of reducing the number of operating parts subject to malfunction. Further, a construction according to the invention greatly reduces the heretofore high element of cost present in air suspension systems which was represented in large part by the complexity of controls required. Multiplicity of controls has been particularly prevalent in pneumatic suspension for trucks, owing to the fact that systems heretofore provided have required auxiliary controls which would permit overruling of a normal automatic control in circumstances where it was desired to lower the sprung mass of a truck tractor for engagement with a cargo body. It is also to be noted that the great versatility of the present control device is further enhanced by the simplicity of structure by which the wide range of control is obtained. Specifically, manufacture of the device involves no unusual fabricating technique, owing to the fact that the passages 56 and 58 in element 50 are perfectly straight and uniform in diameter and may, therefore, be produced by simple drilling operations.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a device of the class described, a cylindrical casing having four uniformly circumferentially spaced ports formed in the wall thereof, said wall defining a circular cavity, a circular closure element closely interfitting said cavity and rotatable about an axis equally spaced from and perpendicular to said ports, said closure having a first passage extending completely therethrough on an axis perpendicular to the axis of rotation of the closure, and a second passage extending partially through said closure for communication with said first passage, the first passage being offset from the said axis of rotation and the second passage being aligned therewith.

2. The structure set forth in claim 1 wherein said first passage is offset from the axis of rotation of said closure in the direction of said second passage.

3. The structure set forth in claim 1 wherein the diameter of said passages are substantially equal to each other and to the diameters of said ports.

References Cited in the file of this patent

UNITED STATES PATENTS

| | | |
|---|---|---|
| 662,438 | Huckins | Nov. 27, 1900 |
| 1,685,330 | Maroney | Sept. 25, 1928 |
| 2,742,301 | Pointer | Apr. 17, 1956 |